(12) United States Patent
Cosentino

(10) Patent No.: US 9,242,715 B2
(45) Date of Patent: Jan. 26, 2016

(54) JOINT BETWEEN AIRCRAFT COMPONENTS

(75) Inventor: Enzo Cosentino, Bristol (GB)

(73) Assignee: Airbus Operations Limited, Bristol (GB)

( * ) Notice: Subject to any disclaimer, the term of this patent is extended or adjusted under 35 U.S.C. 154(b) by 1089 days.

(21) Appl. No.: 12/998,048

(22) PCT Filed: Oct. 15, 2009

(86) PCT No.: PCT/GB2009/051377
§ 371 (c)(1),
(2), (4) Date: Mar. 11, 2011

(87) PCT Pub. No.: WO2010/046684
PCT Pub. Date: Apr. 29, 2010

(65) Prior Publication Data
US 2011/0164918 A1    Jul. 7, 2011

(30) Foreign Application Priority Data
Oct. 20, 2008 (GB) .................................. 0819159.5

(51) Int. Cl.
*F16B 11/00*    (2006.01)
*B64C 1/12*    (2006.01)

(52) U.S. Cl.
CPC ................. *B64C 1/12* (2013.01); *F16B 11/006* (2013.01); *Y10T 403/47* (2015.01); *Y10T 403/471* (2015.01)

(58) Field of Classification Search
CPC ............ B64C 3/18; B64C 3/182; B64C 3/26; B64C 1/064; F16B 11/00
USPC ....... 403/265, 266, 267, 268, 408.1; 244/126; 52/309.2; 296/29; 156/91, 92
See application file for complete search history.

(56) References Cited

U.S. PATENT DOCUMENTS

| | | | | |
|---|---|---|---|---|
| 837,767 | A | * | 12/1906 | Aims ............................ 405/152 |
| 2,140,672 | A | * | 12/1938 | Reid et al. ........................ 156/92 |
| 2,590,803 | A | * | 3/1952 | Unger et al. ................... 220/328 |
| 2,696,451 | A | * | 12/1954 | Snyder ............................ 428/83 |
| 2,710,113 | A | * | 6/1955 | Pritchard ...................... 220/681 |
| 3,655,424 | A | | 4/1972 | Orowan |
| 4,109,435 | A | * | 8/1978 | Loyd ............................ 52/309.1 |
| 4,219,980 | A | * | 9/1980 | Loyd ............................ 52/309.1 |
| 4,350,728 | A | * | 9/1982 | Huang et al. .................. 428/105 |

(Continued)

FOREIGN PATENT DOCUMENTS

| | | |
|---|---|---|
| EP | 0 623 758 | 11/1994 |
| EP | 0 779 437 | 6/1997 |
| WO | 99/51494 | 10/1999 |

OTHER PUBLICATIONS

International Search Report for PCT/GB2009/051377, dated Dec. 28, 2009.

(Continued)

*Primary Examiner* — Daniel P Stodola
*Assistant Examiner* — Matthew R McMahon
(74) *Attorney, Agent, or Firm* — Nixon & Vanderhye P.C.

(57) ABSTRACT

A joint between a pair of aircraft components comprising a first component; a second component bonded to the first component over a bonded area, the bonded area terminating at an edge; a non-bonded area located between the edge of the bonded area and an edge of the second component, the components not being bonded over the non-bonded area; and one or more fasteners passing through the non-bonded area and fastening the first component to the second component.

17 Claims, 5 Drawing Sheets

(56) References Cited

U.S. PATENT DOCUMENTS

| | | | |
|---|---|---|---|
| 4,760,493 A * | 7/1988 | Pearson | 361/218 |
| 4,848,137 A * | 7/1989 | Turner et al. | 73/1.81 |
| 4,891,732 A * | 1/1990 | Jones | 361/218 |
| 5,842,317 A | 12/1998 | Pettit | |
| 5,845,872 A * | 12/1998 | Pridham et al. | 244/1 A |
| 5,855,260 A * | 1/1999 | Rubin | 188/379 |
| 5,902,535 A * | 5/1999 | Burgess et al. | 264/257 |
| 6,083,604 A * | 7/2000 | Haraga et al. | 428/132 |
| 6,320,118 B1 | 11/2001 | Pridham et al. | |
| 6,378,805 B1 * | 4/2002 | Stephan et al. | 244/119 |
| 7,140,800 B2 * | 11/2006 | Sugiyama et al. | 403/266 |
| 7,202,321 B2 * | 4/2007 | Byrd et al. | 528/26 |
| 7,240,821 B2 * | 7/2007 | Talwar | 228/175 |
| 7,690,164 B2 * | 4/2010 | Walker et al. | 52/309.1 |
| 7,761,973 B2 * | 7/2010 | Toback | 29/525.13 |
| 7,900,412 B2 * | 3/2011 | West et al. | 52/394 |
| 8,444,087 B2 * | 5/2013 | Kismarton | 244/119 |
| 8,540,453 B2 * | 9/2013 | Hethcock et al. | 403/265 |
| 8,844,868 B2 * | 9/2014 | Kolax et al. | 244/119 |
| 2003/0041948 A1 * | 3/2003 | Bersuch et al. | 156/91 |
| 2005/0211846 A1 | 9/2005 | Leon-Dufour et al. | |
| 2005/0244215 A1 | 11/2005 | Prat et al. | |
| 2008/0131656 A1 * | 6/2008 | Walker et al. | 428/120 |
| 2009/0232591 A1 * | 9/2009 | Hethcock et al. | 403/166 |
| 2010/0127122 A1 * | 5/2010 | Cosentino | 244/117 R |

OTHER PUBLICATIONS

Written Opinion for PCT/GB2009/051377, dated Dec. 28, 2009.
Search Report for GB 0819159.5, dated Feb. 14, 2009.

* cited by examiner

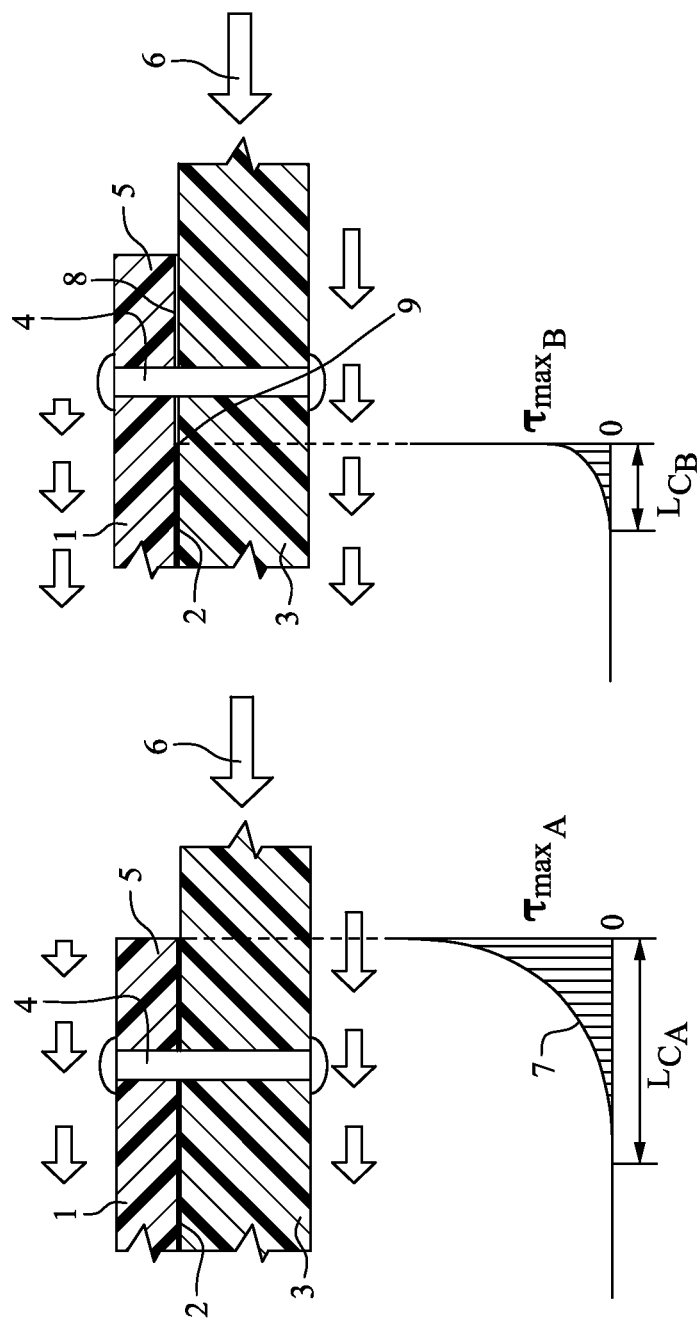

JOINT BETWEEN AIRCRAFT COMPONENTS

This application is the U.S. national phase of International Application No. PCT/GB2009/051377 filed 15 Oct. 2009 which designated the U.S. and claims priority to GB Patent Application No. 0819159.5 filed 20 Oct. 2008, the entire contents of each of which are hereby incorporated by reference.

FIELD OF THE INVENTION

The present invention relates to a joint between a pair of components of an aircraft. The joint comprises a first component; and a second component bonded to the first component over a bonded area. The components may be bonded together by co-curing, co-bonding, secondary bonding (for instance by means of an adhesive layer) or any other suitable bonding method.

BACKGROUND OF THE INVENTION

FIG. 1 shows a conventional joint between a stringer foot 1 and a wing skin panel 2. The components are bonded together by an adhesive layer 3. A failsafe bolt 4 maintains a connection between the components in the event of failure of the adhesive layer 3.

Three main types of load typically act on the joint when the aircraft wing is in use. Firstly, loads act on the joint as a result of local curvature of the wing skin 2 which is caused by global bending of the wing. Secondly, shear loads act on the wing skin 2 which must be transmitted to the stringer 1 through the joint. Finally, as a result of the geometrical discontinuity at the stringer run-out 5, peeling loads can act to separate the stringer foot 1 from the skin 2.

Shear stresses 6 are transferred by the adhesive layer 3 from the skin 2 to the stringer foot 1 as shown in the graph 7. The shear stresses are at a maximum where the transfer starts, then they reach zero once all the load is proportionally distributed between the components. While the adhesive layer 3 remains intact, the bolt 4 transmits little or no shear stress.

A problem with the arrangement of FIG. 1 is that the adhesive layer 3 is susceptible to cracking which typically initiates at the stringer run-out 5 where the shear stress 7 is at a maximum.

Although the structure as a whole can withstand relatively high loads before catastrophic failure due to the presence of the failsafe bolt 4, aircraft regulations require the total integrity of the structure to be preserved. It is therefore necessary to prevent crack initiation up to ultimate load levels, that is the highest load levels that are likely to be experienced during the operational life of the aircraft. This is typically achieved by thickening the skin 2.

SUMMARY OF THE INVENTION

A first aspect of the invention provides a joint between a pair of aircraft components comprising a first component; a second component bonded to the first component over a bonded area, the bonded area terminating at an edge; a non-bonded area located between the edge of the bonded area and an edge of the second component, the components not being bonded over the non-bonded area; and one or more fasteners passing through the non-bonded area and fastening the first component to the second component.

The first component may for example comprise a panel and the second component may for example comprise a stringer with a pair of side edges and an end edge which is shorter than the side edges. In this case, the non-bonded area is located between the edge of the bonded area and the end edge of the stringer.

Preferably, the joint further comprises a shim layer which is positioned between the components within the non-bonded area. The shim layer is formed from a low friction material wherein the coefficient of friction between the shim layer and the first component is less than the coefficient of friction between the second component and the first component. The shim layer preferably extends over the majority of the non-bonded area.

Optionally, the shim layer may be omitted, in which case the first and/or second components may comprise a step which substantially fills the non-bonded area between the two components. This prevents bonding from occurring in the non-bonded area during manufacture in the absence of the shim layer.

Preferably the fastener passes through one or both of the components and, if it is included, the shim layer. The fastener is preferably a bolt.

Preferably, the fastener which is closest to the edge of the bonded area has a shaft passing through the non-bonded area with a minimum diameter D, wherein the distance L between a central axis of the shaft and the edge of the bonded area is greater than 2D.

The second component may be bonded to the first component over the bonded area by co-curing, co-bonding, or secondary bonding. One or both of the components may be formed from a plurality of layers which may be, for example, of composite material.

A second aspect of the invention provides a method of transferring shear force between the components, the method comprising transferring substantially no shear force between the components via the non-bonded area and transferring at least some of the shear force between the components via the fastener(s).

Preferably, the method further includes bonding the second component to the first component over the bonded area; preventing the components from being bonded in the non-bonded area; and fastening the components together with one or more fasteners passing through the non-bonded area. Preferably, the components are prevented from being bonded in the non-bonded area by a shim layer which is positioned between the components and within the non-bonded area during the bonding step. As described above, this shim layer may optionally be omitted, in which case one (or both) of the components may additionally comprise a step which substantially fills the non-bonded area, thus preventing bonding from occurring in the non-bonded area during manufacture.

A further aspect of the invention provides an aircraft comprising a joint according to the first aspect of the invention.

BRIEF DESCRIPTION OF THE DRAWINGS

Embodiments of the invention will now be described with reference to the accompanying drawings, in which:

FIG. 1 shows a conventional joint between a stringer and a panel;

FIG. 2 shows a joint according to an embodiment of the present invention;

DETAILED DESCRIPTION OF EMBODIMENT(S)

Figure 3:
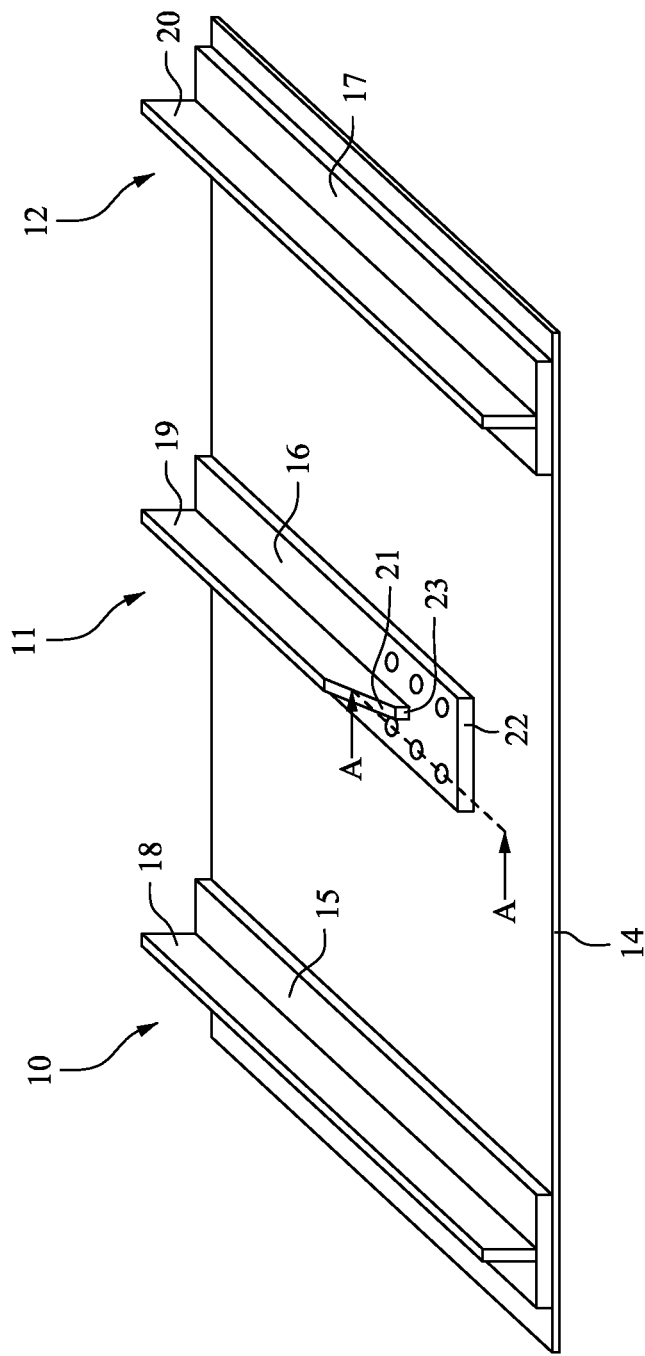
FIG. 3 shows three stringers attached to the internal face of an aircraft wing skin.

FIG. 3 shows three stringers 10-12 attached to the inner surface of the lower skin 14 of an aircraft wing. The stringers 10-12 and skin 14 are made from a laminar composite material, such as Carbon Fibre Reinforced Plastic (CFRP). Typically the CFRP comprises a series of layers of unidirectional carbon fibres impregnated with an epoxy resin matrix.

Each stringer 10-12 has a foot 15-17 oriented parallel with the skin 14 and a blade 18-20 oriented at right angles to the skin 14. Each stringer foot has a pair of relatively long side edges and a pair of relatively short end edges. These end edges are conventionally known as "run-outs". One run-out 22 of the stringer foot 16 is shown, but the run-outs of the stringer feet 15, 17 are not shown. Note that the blade 19 of the stringer 11 has a tapered end edge 21 terminating at a tip 23 which is short of the run-out 22. This helps to smooth the load transfer process between the skin 14 and the stringer 11.

Figure 4:
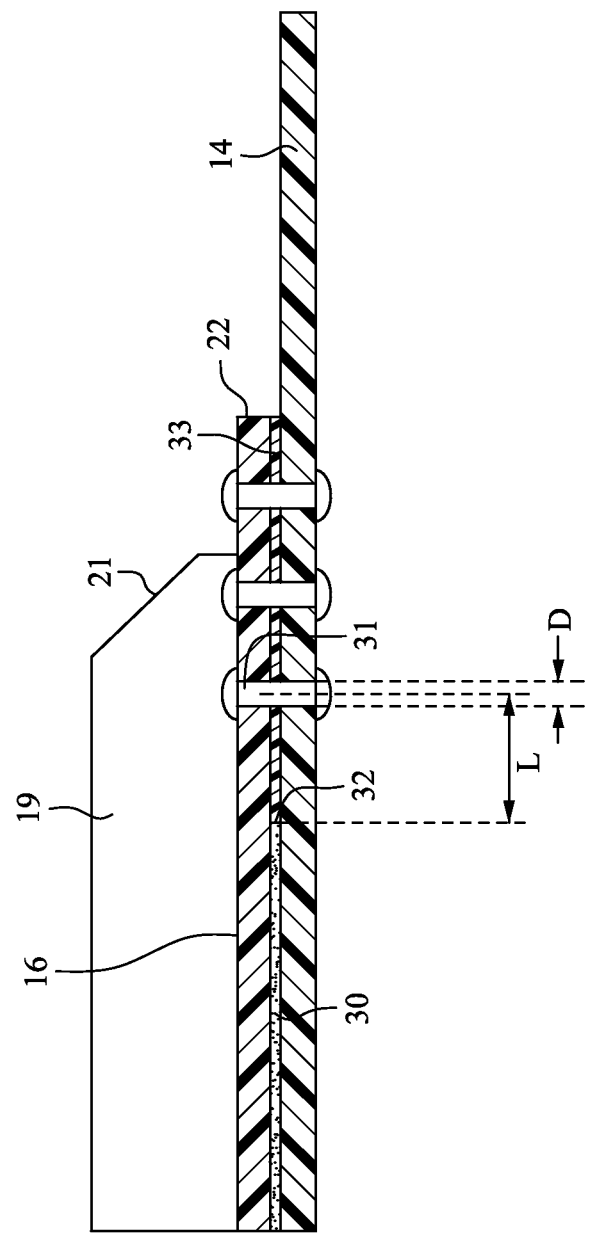
FIG. 4 is a cross-sectional view along a line A-A indicated in FIG. 3.

FIG. 4 is a cross sectional view taken along the line A-A indicated in FIG. 3, showing the stringer/skin joint in the region of the stringer run-out. The foot 16 of the stringer 11 is attached to the wing skin 14 by an adhesive layer 30 and a set of six bolts 31, three of which are shown in FIG. 4. The adhesive layer 30 terminates at an edge 32 leaving a non-bonded area, where no adhesive is present, between the edge 32 and the run-out 22. A shim layer 33 is positioned between the components in this non-bonded area. The bolts 31 pass through the components 14,16 and the shim layer 33.

In contrast to the conventional arrangement of FIG. 1, the bolts 31 transfer a significant proportion of the shear load between the components. This principal is shown in FIG. 2 which shows the joint of FIG. 1 modified by placing a shim layer 8 between the components and terminating the adhesive layer 3 at an edge 9. Because little or no shear stress can be transferred by the shim layer 8, the bolt 4 transmits a significant proportion of the shear load, and the shear load transferred by the adhesive is much lower. Thus the chance of a crack initiating in the adhesive is much reduced compared with the arrangement of FIG. 1. Similar principals apply to the joint shown in FIG. 4.

Note that the size of the bolts 31 may need to be increased in comparison with a conventional joint, but it is expected that this increase in weight will be more than offset by making the skin and/or stringer thinner.

Moreover, referring back to FIG. 4, since the edge 32 of the adhesive has been moved away from the geometrical discontinuity between the stringer run-out 22 and the skin 14, peeling loads no longer have to be transmitted by the adhesive, the bolts 31 transmitting this load instead. Also, the loads on the adhesive caused by global bending of the wing are minimised or eliminated by locating the edge 32 at a position on the wing where the bending moment is lower.

To ensure that the majority of the shear stresses are transferred by the bolts 31 rather than the adhesive, it is preferable to maintain a significant gap between the edge 32 and the bolts. More specifically, a distance L (see FIG. 4) can be defined between the edge 32 of the bonded area and the central axis of the shaft of bolt 31, which is the closest bolt to the edge 32 of the bonded area. This distance L is preferably greater than twice the smallest diameter, D, of the shaft of bolt 31 but less than the buckling distance. The buckling distance is defined as the largest distance L that can be tolerated before the structure becomes exposed to an unacceptable risk of buckling.

The shim layer 33 is formed from a material with a low coefficient of friction, such as Teflon. This is particularly important if the bolts 31 are pre-tensioned. This minimizes the transfer of shear stresses through the shim layer 33. The shim layer 33 also prevents water infiltration into the non-bonded area.

Figure 5:
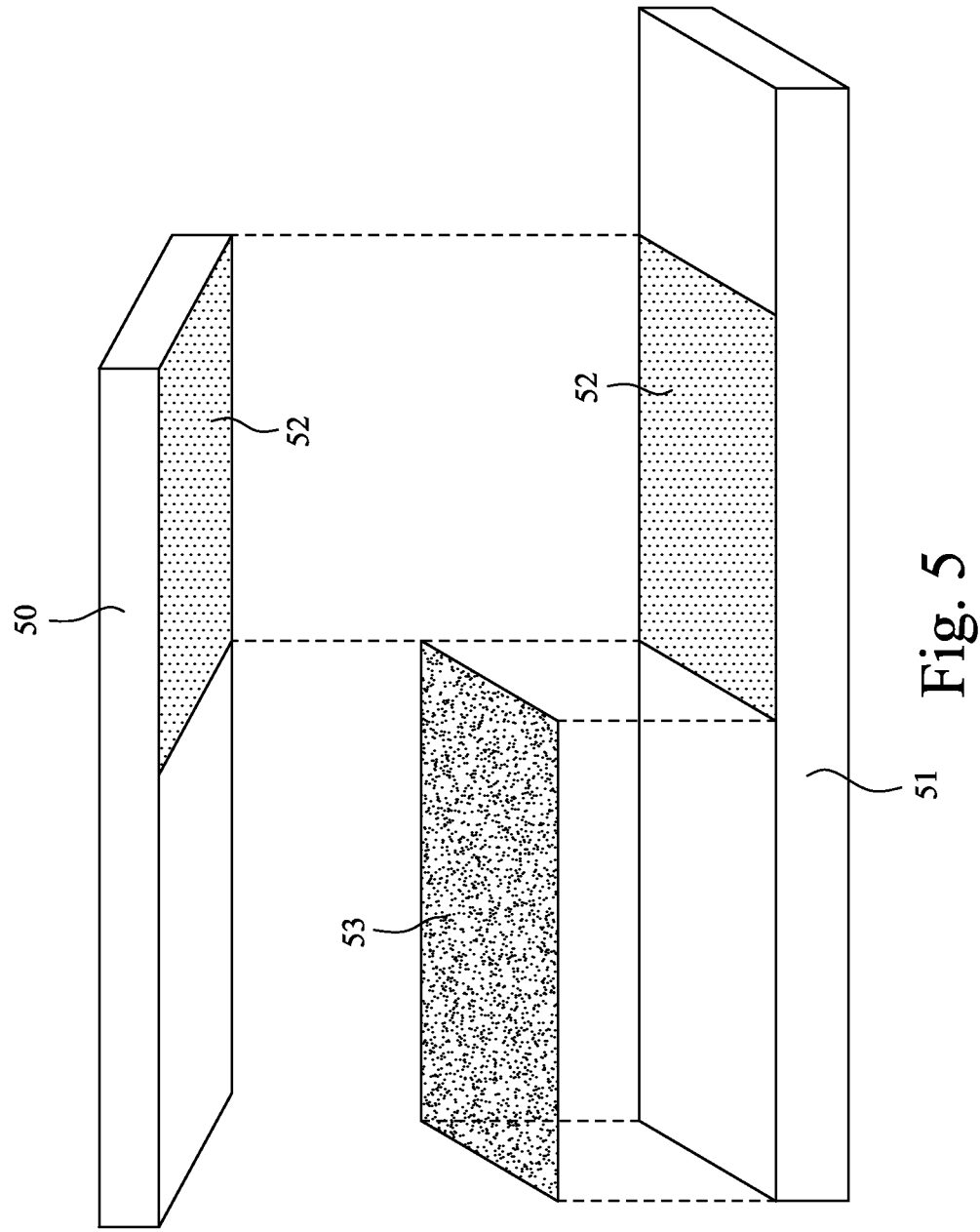
FIG. 5 illustrates a method of manufacture of a joint between two components.
Figure 6:
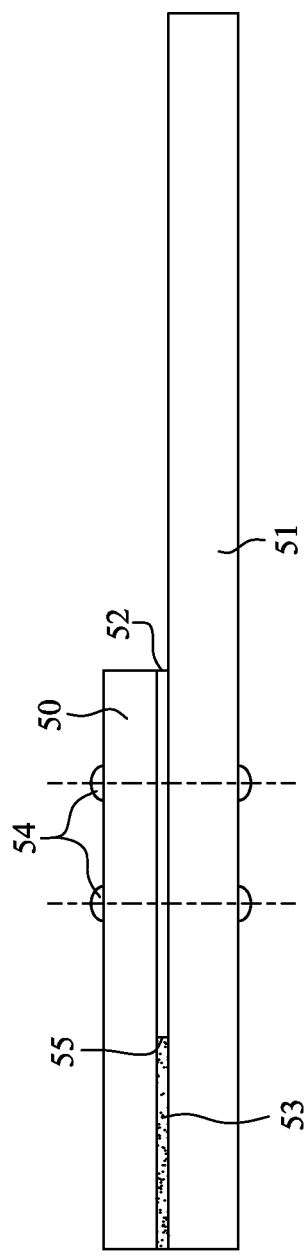
FIG. 6 shows the resultant joint from the method of FIG. 5.

FIG. 5 illustrates a method of manufacturing a joint similar to those described above between first and second components 50, 51. Firstly, a shim layer 52 is laid on the first and/or second component 50 in the non-bonded area. Next, a layer of adhesive 53 is applied to the first component 50 in the bonded area. The two components are then pressed together until the adhesive has set. After the adhesive has set, bolts 54 are passed through the non-bonded area. The resulting joint is shown in FIG. 6. The shim layer 52 allows the position of the edge 55 of the bonded area to be easily controlled. The joints shown in FIGS. 2 and 4 may also be manufactured by this method. In this case the adhesive layer is typically applied to the panel, and the stringer is pressed onto the adhesive layer on the panel.

In the example of FIG. 5, both components are pre-cured before being bonded together by a layer of adhesive. However, other bonding methods may be employed, including co-curing and co-bonding. In the case of co-curing, the components are cured simultaneously and as they cure they become bonded together in the bonded area and the shim layer prevents the epoxy resin from flowing into the non-bonded area. An adhesive layer may or may not be present in the co-curing case. In the case of co-bonding, one of the components (typically the panel) is pre-cured and the stringer is cured on the panel. An adhesive layer may or may not be present in the co-bonding case.

Although the invention has been described above with reference to one or more preferred embodiments, it will be appreciated that various changes or modifications may be made without departing from the scope of the invention as defined in the appended claims.

The invention claimed is:

1. A joint between a pair of aircraft components comprising:
   a first component;
   a second component bonded to the first component over a bonded area, the bonded area terminating at an edge;
   a non-bonded area between said first and second components located between the edge of the bonded area and an edge of the second component, the components not being bonded over the non-bonded area and said non-bonded area not transferring substantial shear forces between said components, wherein a shim layer confined to the non-bonded area is between the first and second components and has a coefficient of friction with respect to the first or second components which is less than a coefficient of friction between the first and second components in the bonded area; and
   one or more fasteners passing through the non-bonded area and fastening the first component to the second component, wherein each of the components is formed from a composite material, and the one or more fasteners passes through the first and second components.

2. The joint of claim 1 wherein each fastener passes through the shim layer.

3. The joint of claim 1 wherein the shim layer extends over the majority of the non-bonded area.

4. The joint of claim 1 wherein the fastener which is closest to the edge of the bonded area has a shaft passing through the non-bonded area with a minimum diameter D, and wherein the distance L between a central axis of the shaft and the edge of the bonded area is greater than 2D.

5. The joint of claim 1 wherein the second component is bonded to the first component over the bonded area by co-curing, co-bonding, or secondary bonding.

6. A joint between a pair of aircraft components comprising:
- a first component;
- a second component bonded to the first component over a bonded area, the bonded area terminating at an edge;
- a non-bonded area between said first and second components and located between the edge of the bonded area and an edge of the second component, the components not being bonded over the non-bonded area and said non-bonded area not transferring substantial shear forces between said components, wherein a shim layer confined to the non-bonded area, is between the first and second components and has a coefficient of friction with respect to the first or second components which is less than a coefficient of friction between the first and second components in the bonded area; and
- one or more fasteners passing through the non-bonded area and fastening the first component to the second component, wherein the first component comprises a panel and the second component comprises a stringer with a pair of side edges and an end edge which is shorter than the side edges, and wherein the non-bonded area is located between the edge of the bonded area and the end edge of the stringer.

7. The joint of claim 6 wherein each of the one or more fasteners passes through one or both of the components.

8. The joint of claim 7 wherein said each of the one or more fasteners is a bolt.

9. The joint of claim 6 wherein one or both of the components is formed from a plurality of layers.

10. A joint between a pair of aircraft components comprising:
- a first component;
- a second component bonded to the first component over a bonded area, the bonded area terminating at an edge;
- a non-bonded area between said first and second components located between the edge of the bonded area and an edge of the second component, the components not being bonded over the non-bonded area and not transferring substantial shear forces between said components;
- one or more fasteners passing through the non-bonded area and fastening the first component to the second component, wherein each of the components is formed from a composite material, and the one or more fasteners passes through the first and second components, and
- a shim layer which is positioned between the components within the non-bonded area, wherein the shim layer is formed from a low friction material whereby the coefficient of friction between the shim layer and the first component is less than the coefficient of friction between the second component and the first component.

11. A method of transferring shear force between the components in a joint between a pair of aircraft components, wherein the joint includes:
- a first component;
- a second component bonded to the first component over a bonded area, the bonded area terminating at an edge;
- a non-bonded area between said first and second components located between the edge of the bonded area and an edge of the second component, the components not being bonded over the non-bonded area and not transferring substantial shear forces between said components,
- one or more fasteners passing through the non-bonded area and fastening the first component to the second component, wherein each of the components is formed from a composite material, and the one or more fasteners passes through the first and second components, and
- a shim layer confined to the non-bonded area, wherein the shim layer is between the first and second components and has a coefficient of friction with respect to the first or second components less than a coefficient of friction between the first and second components in the bonded area, wherein the method comprises transferring substantially no shear force between the components via the non-bonded area and transferring at least some of the shear force between the components via the one or more fasteners.

12. A method of manufacturing a joint to fit between a pair of aircraft components, wherein the joint includes:
- a first component;
- a second component bonded to the first component over a bonded area, the bonded area terminating at an edge;
- a non-bonded area between said first and second components located between the edge of the bonded area and an edge of the second component, the components not being bonded over the non-bonded area and not transferring substantial shear forces between said components; and
- one or more fasteners passing through the non-bonded area and fastening the first component to the second component, wherein each of the components is formed from a composite material, and the one or more fasteners passes through the first and second components, wherein the method comprises:
- bonding the second component to the first component over the bonded area;
- preventing the components from being bonded in the non-bonded area by a shim layer confined to the non-bonded area, wherein the shim layer is between the first and second components and has a coefficient of friction with respect to the first or second components less than a coefficient of friction between the first and second components in the bonded area; and
- fastening the components together with one or more fasteners passing through the non-bonded area.

13. The method of claim 12 wherein the components are prevented from being bonded in the non-bonded area by a shim layer which is positioned between the components and within the non-bonded area during the bonding step.

14. A joint between a pair of aircraft components comprising:
- a first component;
- a second component bonded to the first component over a bonded area, the bonded area terminating at an edge of the bonded area;
- a non-bonded area between said first and second components located between the edge of the bonded area and an edge of the second component, the components not being bonded over the non-bonded area and said non-bonded area not transferring substantial shear forces between said components, wherein a shim layer confined to the non-bonded area, is between the first and second components and has a coefficient of friction with respect to the first or second components less than a coefficient of friction between the first and second components in the bonded area; and one or more fasteners passing through the non-bonded area and fastening the first component to the second component, wherein the one or more fasteners pass through the first and second components.

15. The joint of claim 14 wherein each component comprises a plurality of composite layers.

16. A joint between a pair of aircraft components comprising:

a first component;

a second component bonded to the first component over a bonded area, the bonded area terminating at an edge of the bonded area;

a non-bonded area between said first and second components located between the edge of the bonded area and an edge of the second component, the components not being bonded over the non-bonded area and not transferring substantial shear forces between said components;

one or more fasteners passing through the non-bonded area and fastening the first component to the second component, wherein the one or more fasteners pass through the first and second components, and a shim layer is positioned between the components within the non-bonded area, wherein the shim layer is formed from a low friction material whereby the coefficient of friction between the shim layer and the first component is less than the coefficient of friction between the second component and the first component.

17. The joint of claim 16 wherein each fastener passes through the shim layer.

\* \* \* \* \*